United States Patent [19]

Chari et al.

[11] 4,168,523

[45] Sep. 18, 1979

[54] DATA PROCESSOR UTILIZING A TWO LEVEL MICROADDRESSING CONTROLLER

[75] Inventors: Venu Chari, San Diego, Calif.; Ronald L. Engelbrecht, Augusta, Kans.

[73] Assignee: NCR Corporation, Dayton, Ohio

[21] Appl. No.: 858,050

[22] Filed: Dec. 6, 1977

Related U.S. Application Data

[63] Continuation-in-part of Ser. No. 629,740, Nov. 7, 1975, abandoned.

[51] Int. Cl.$^2$ .............................................. G06F 9/20
[52] U.S. Cl. ................................................ 364/200
[58] Field of Search ............................... 364/200 MS

[56] References Cited

U.S. PATENT DOCUMENTS

| | | | |
|---|---|---|---|
| 3,445,818 | 5/1969 | Yen | 364/200 |
| 3,859,636 | 1/1975 | Cook | 364/200 |
| 3,900,835 | 8/1975 | Bell et al. | 364/200 |
| 3,991,404 | 11/1976 | Brioschi et al. | 364/200 |

*Primary Examiner*—Harvey E. Springborn
*Attorney, Agent, or Firm*—J. T. Cavender; Edward Dugas; Stephen F. Jewett

[57] ABSTRACT

A data processor utilizes a central processor controller to determine selectively the next required operation phase while executing a current operation phase. Control words contained in a second stage control memory are selectively addressed from addresses contained in a first stage control memory. The selection of a particular address of a control word contained in said first stage control memory is determined from combinations of signals received by a condition multiplexer interposed between said first and second stage control memories, portions of program instructions contained in main memory, externally operated manual switches, and various internal control flags. The operation phase is defined as an operation, which is defined by said control word. The generation of the address for the next required control word and the execution of the operation defined by the current control word occurs in the same machine cycle. Each control word comprises a mode of operation, control signals for the various execute units, and input signals for the condition multiplexer for determining the next operation phase control word address, required by the data processor in the process of executing program instructions contained in the data processor's main memory.

6 Claims, 12 Drawing Figures

FIG. 7
CONDITION MULTIPLEXER INPUT TABLE

| MACH. OPERATION PHASE | CM8 | CM7 | CM6 | CM5 | CM4 | CM3 | CM2 | CM1 |
|---|---|---|---|---|---|---|---|---|
| IDLE | ϕ | ϕ | COM | ϕ | X | X | X | X |
|      | ϕ | ϕ | X | 1 | X | X | X | X |
| FETCH | ϕ | 1 | ϕ | ϕ | X | HS | X | X |
| DECODE | 1 | ϕ | X | ϕ | RR | X | M2 | M1 |
|        | 1 | ϕ | X | 1 | RR | X | M2 | M1 |
| EXECUTE | 1 | 1 | ϕ | ϕ | Q4 | Q3 | Q2 | Q1 |
|         | 1 | 1 | ϕ | 1 | Q4 | Q3 | Q2 | Q1 |
|         | 1 | 1 | 1 | ϕ | Q4 | Q3 | Q2 | Q1 |
|         | 1 | 1 | 1 | 1 | Q4 | Q3 | Q2 | Q1 |

FIG. 8

| SYSCLK | CMAR CONTENTS CROM INPUT | CR8 (NEXT OPERATION PHASE) | CR7 | CR6 (NEXT OPERATION PHASE MODE) | CR5 | CR4 (CONDITION MULTIPLEXER MODE) | AROM INPUT | AROM OUTPUT |
|---|---|---|---|---|---|---|---|---|
| 1 | ϕϕ | ϕ | ϕ | ϕ | ϕ | ϕ | ϕϕ | ϕϕ |
| 2 | ϕϕ | ϕ | ϕ | ϕ | ϕ | ϕ | 2ϕ | ϕ3 |
| 3 | ϕ3 | ϕ | 1 | ϕ | ϕ | ϕ | 4ϕ | ϕ4 |
| 4 | ϕ4 | 1 | ϕ | ϕ | ϕ | ϕ | 8ϕ | 27 |
| 5 | 27 | 1 | 1 | ϕ | ϕ | 1 | C4 | 82 |
| 6 | 82 | 1 | 1 | 0 | 1 | 1 | D4 | 94 |
| 7 | 94 | 1 | 1 | 1 | 0 | 1 | E4 | A7 |
| 8 | A7 | ϕ | ϕ | 0 | 1 | 0 | 10 | ϕ3 |
| 9 | 03 | ϕ | 1 | ϕ | ϕ | ϕ | 44 | ϕϕ |
| 10 | ϕϕ | ϕ | ϕ | ϕ | ϕ | ϕ | ϕϕ | ϕϕ |

CROM OUTPUT

DATA PROCESSOR UTILIZING A TWO LEVEL MICROADDRESSING CONTROLLER

CROSS REFERENCE TO RELATED APPLICATION

This is a continuation-in-part application of Ser. No. 629,740 filed Nov. 7, 1975, entitled Data Processor Utilizing A Two Level Microaddressing Controller, now abandoned.

BACKGROUND OF THE INVENTION

Although the concept of microprogramming was developed by Wilkes over twenty years ago, much work continues to be done in order to develop more compact and economical techniques of implementing microprogrammable control logic in a computer. The functions of this control logic may be divided into two broad areas:

a. The control of the functions of the machine in response to a program instruction accessed from main memory, the program instruction being defined as a microinstruction requiring some number of subordinate machine elements (registers, flags, switches, flip-flops, counters, etc.) for its execution, the setting up of the subordinate machine elements being accomplished by a subordinate set of program instructions called microinstructions, which are normally contained in read only memories (ROM) and machine logic.

b. The determination of the sequences of microinstructions required to complete the execution of the macroinstruction referred to above and to return the machine to a state of readiness to receive the next macroinstruction. The latter function is of particular interest because it is typically implemented with branch and default fields in the microinstruction word, and supplemented with hardwired random logic. Alternately, in a vertically microprogrammed machine, in order to effect a branch to the proper next microinstruction word, a special microinstruction word is required, along with an additional machine cycle.

What is desired, therefore, is a fast and economical technique by which the appropriate next operation phase of the machine may be determined. This technique should require minimal additional bits in the microinstruction word, minimal additional random logic, and no additional machine cycles. Furthermore, the machine cycle should not need to be slowed by the implementation of this technique.

One example of the state of the art in microprogram controlled processors is the data processor disclosed in U.S. Pat. No. 3,859,636, entitled "Microprogram Controlled Data Processor For Executing Microprogram Instructions from Microprogram Memory Or Main Memory", by R. W. Cook. In the data processor disclosed in that patent the words stored in the microprogram memory each comprise an instruction portion and a next microprogram instruction word address portion. The words obtained from the microprogram memory are stored in a microprogram instruction register. The next microprogram instruction word address portion of a microprogram memory word stored in the instruction register is gated to another register to fetch the next microprogram instruction word of the sequence from the microprogram memory. The instruction portion of a microprogram memory word stored in the instruction register is decoded by a microprogram decoder, which decoder generates control signals for performing the desired processing action.

Applicants' data processor controller differs from the above prior art processor in that the address of the next micro-instruction is determined simultaneously with the execution of the present micro-instruction. Further, the prior art processor addresses only fixed, predetermined sequences of microinstructions, whereas applicants' controller selectively generates the sequences of microinstructions by generating said address of the next micro-instruction in accordance with a combination of inputs derived from the present machine state and a program instruction contained in main memory.

SUMMARY OF THE INVENTION

The present invention is directed to the control of a data processor and more particularly to the control of a data processor wherein the determination of the next required operation phase of the data processor and the execution of the present operation phase of the data processor occurs in a single machine cycle. The micro-instruction (or micro-operation) of the processor is referred to as the operation phase.

In one preferred embodiment of the present invention there is provided in a data processing system a controller for selectively determining the next operation phase required for execution from conditions existing and resulting during the execution of the current operation phase. The controller utilizes two levels of control memory for its operation. The data processor of the data processing system comprises: a main memory, a controller connected to the main memory, and a data path for connecting the main memory to the controller. The controller comprises: a first stage control memory (AROM), a control memory address register (CMAR), a second stage control memory (CROM), and a condition multiplexer, operatively connected in a manner hereinafter set forth, for the purpose of control of the various functions required by the data processing system in its operation.

An m-bit address generated and inputted to a first stage control memory (AROM), during the execution of an operation phase, addresses one of n possible memory locations. The contents of these locations are addresses of control words stored in a second level control memory (CROM) for subsequent execution. Each operation phase is defined by a control word containing y control terms which are used to control and enable the operation of the data processor, main memory, registers and related logic circuits.

Simultaneously with the execution of one of a plurality of possible operation phase, a portion of the signals from the present operation phase being executed is combined with signals generated by portions of a program instruction contained in main memory, external manually operable switches, and control flags that are internal to the data processor, to generate the address of the next control word which defines the next operation phase.

Each operation phase is designated by a particular control word which, in the context of this invention, is represented by two 4-bit groups, hexidecimally coded, which are preceded by the letters CW for identification purposes.

In the following description, any reference to "first level" shall have the same meaning as "first stage", and in a like manner, any reference to a "second level" shall mean the same as "second stage".

The signals that are received from the various sources that are used to generate the next required operation phase address are all input through a condition multiplexer interposed between the second stage control memory and the first stage control memory. The condition multiplexer accepts the signal inputs and depending on the particular combination of "zeroes" and "ones" received, translates these signals into a next operation phase address which is output to the first stage control memory (AROM).

From the foregoing it can be seen that it is a primary object of the present invention to provide an improved data processor.

It is another object of the present invention to provide a data processor wherein the next required operation phase is determined during the execution of the current operation phase.

It is still a further object of the present invention to execute the current operation phase and to determine the next operation phase in a single machine cycle.

It is yet another object of the present invention to provide a fast and economical data processor.

These and other objects of the present invention will become more apparent when taken in conjunction with the following description and drawings, which drawings form a part of the present application and wherein like characters indicate like parts.

DESCRIPTION OF THE PREFERRED EMBODIMENT

Figure 1:
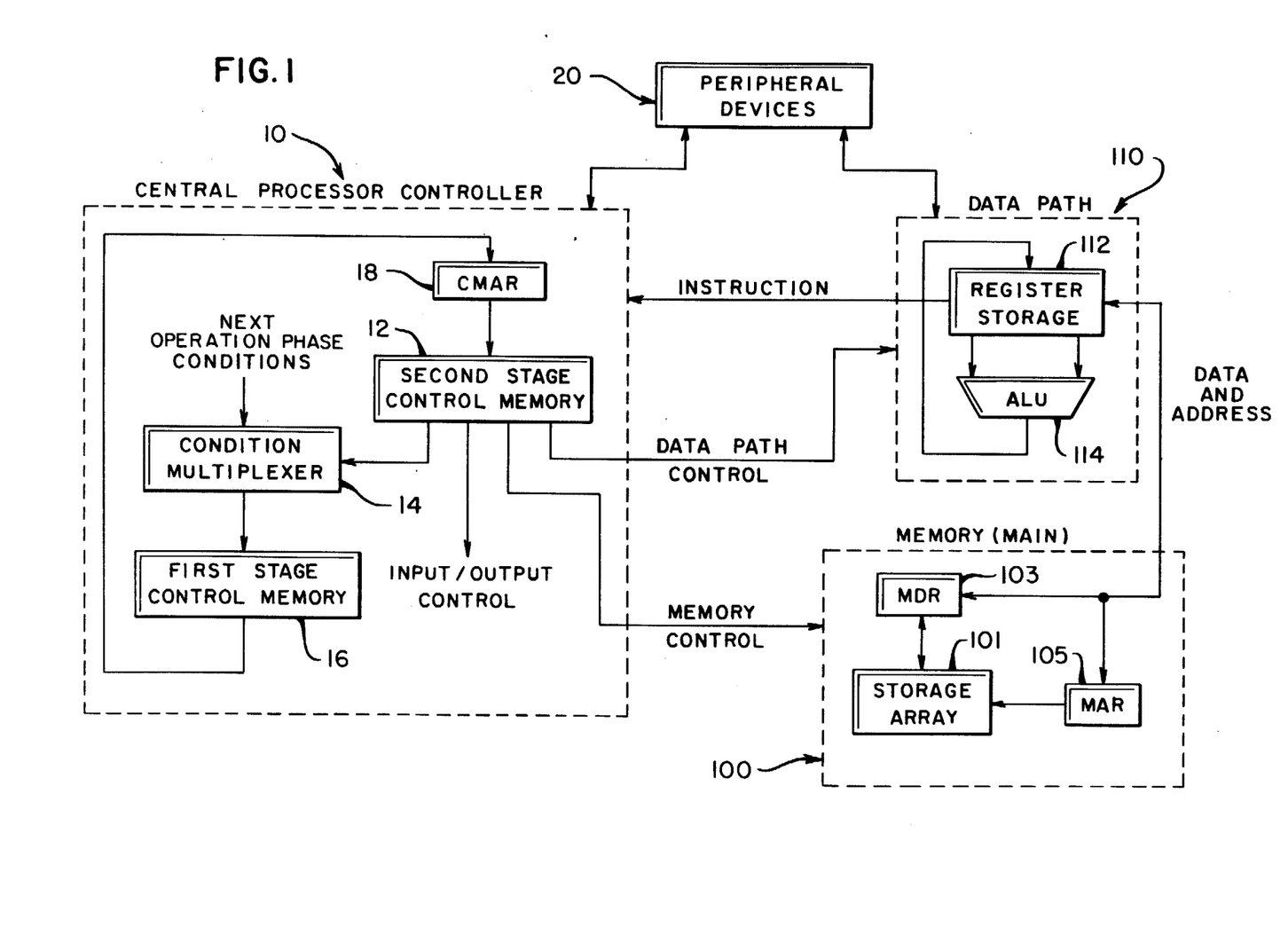
FIG. 1 is a block diagram of a data processing system embodying a two level microaddressing controller.

FIG. 1 is a general diagram of the data processing system. It shows a main memory 100 comprised of a memory data register 103, a memory address register 105 and a storage array 101. The memory data register 103 is used as a temporary storage location for memory data going in or out of the storage array 101. The storage array 101 is the physical storage for the memory data.

A data path 110 is utilized as a data link between the main memory 100, the peripheral devices 20 and the central processor controller 10. Data is exchanged between the main memory 100 and the data path 110 over the data and address lines. In the data path itself the data is held in a temporary register storage 112. Data from the register storage 112 may be modified by the arithmetic and logic unit (ALU) 114 and returned back to the register storage 112. Program instruction words stored in register storage 112 are transferred over instruction lines to the central processor controller 10.

The central processor controller comprises a control memory address register 18 (CMAR), a second stage control memory 12, a condition multiplexer 14, and a first stage control memory 16, which will be referred to in the specification as either an address ROM and AROM. An address is outputted from the first stage control memory 16 for input to the control memory address register 18 (CMAR) which in turn addresses a particular control word (CW) in the second stage control memory 12, which control word specifies the control signals for controlling the machine for one machine cycle. The signals produced by the second stage control memory 12 provide control signals for the data path 110, the main memory 100, and the peripheral devices 20; these signals are called the data path control, memory control and input/output control, respectively. A group of second stage control memory 12 (CROM) output signals also controls the select modes of the condition multiplexer 14, which modes are explained below in more detail. The particular machine conditions or next state signals are transferred through the condition multiplexer 14 under the control of the second stage control memory 12 (CROM) and are caused to address the first stage control memory 16 (AROM). The contents of the first stage control memory 16 (AROM) at the particular addressed location are provided as inputs to the control memory address register 18 (CMAR) and will provide the input address to the second stage control memory 12 (CROM) during the following cycle of the machine. The peripheral devices 20 attached to the data processor are controlled by the central processor controller 10 in order to receive and to transmit data to the data path 110.

Figure 2:
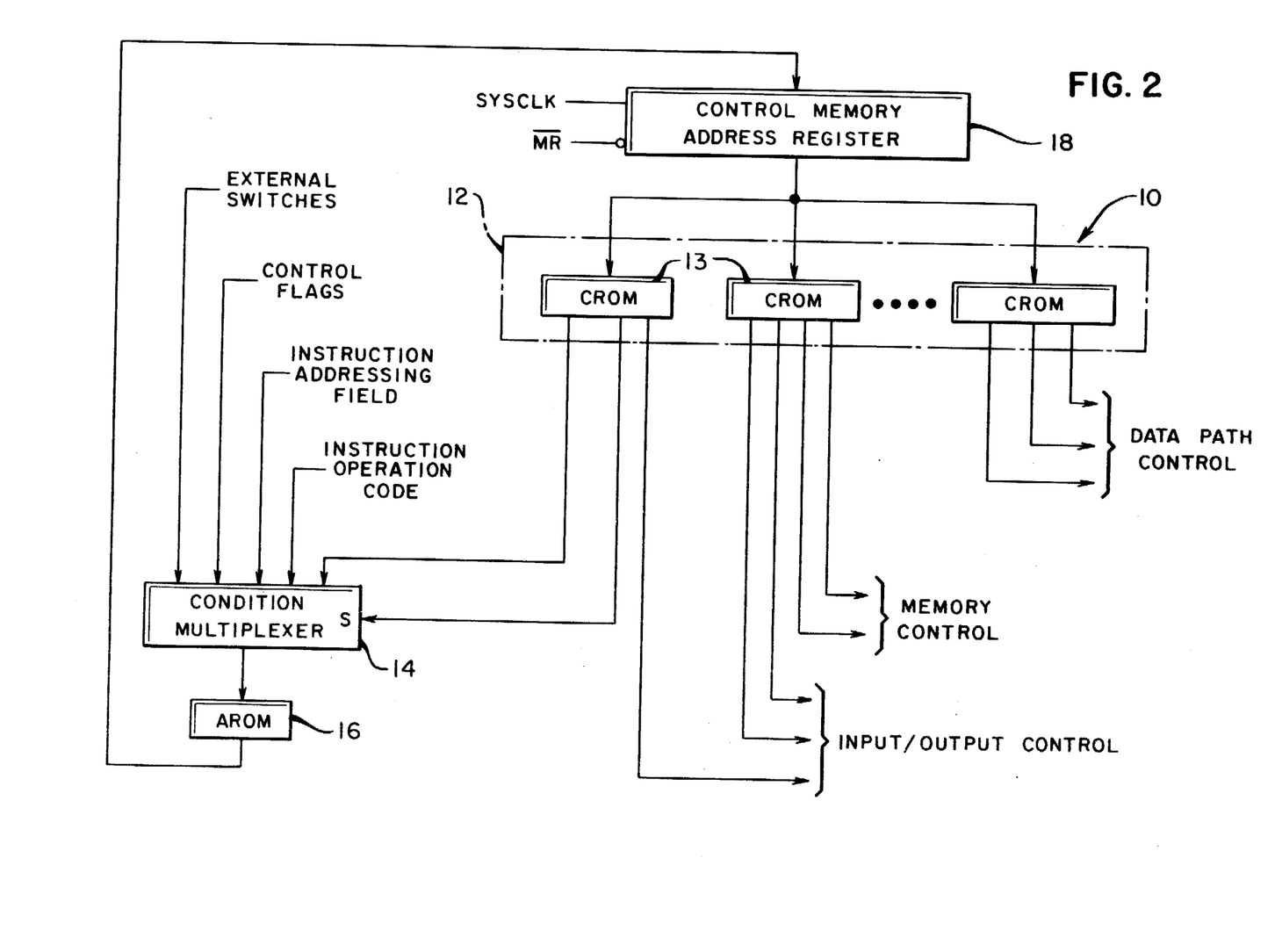
FIG. 2 is a block diagram of the two level microaddressing controller.

Referring to FIG. 2, a more detailed block diagram of the central processor controller 10 is shown. The control memory address register 18 (CMAR) is clocked by the system clock signal, which signal is designated SYSCLK, and is initialized or cleared by the machine master reset signal $\overline{MR}$. The second stage control memory 12 (CROM) is comprised of a plurality of control read only memories (CROMS) 13. The number of CROMs used is variable and dependent upon the control needs of the data processor. Several of the CROMs are also used to control the input/output of peripheral devices 20, main memory 100 and the data path 110. Several of the CROM outputs are used both as inputs to the condition multiplexer 14 and as the actual select controls of the condition multiplexer 14. Other inputs to the condition multiplexer 14 include external switch signals, various control flags that are internal to the central processor control 10, the instruction addressing field of the program instruction currently being executed, and the instruction operation code of the program instruction, the latter two being taken from the data path 110. The condition multiplexer outputs are presented as address inputs to the AROM 16. The contents of the selected address read only memory word are then presented to the inputs of the control memory address register 18, to be latched into the register on the following system clock.

Figure 3A:
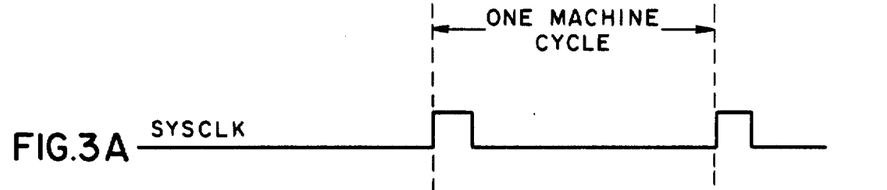
FIGS. 3a–3e are timing diagrams illustrating signals of interest in the operation of the invention.

Referring now to the waveforms shown in FIG. 3a–3e in conjunction with the block diagram shown in FIG. 2, in FIG. 3a the waveform for the system clock SYSCLK is shown, with the time interval between leading edges of succeeding system clocks defined to be one machine cycle. The SYSCLK signal is applied to the control memory address register 18.

Figure 3B:
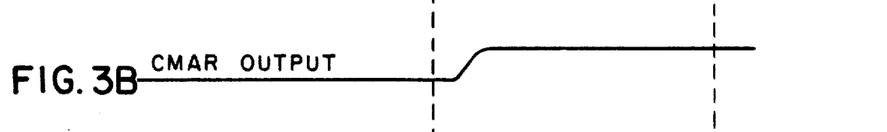

FIG. 3b shows the output of control memory address register 18 during one machine cycle. This register, being clocked by the system clock, will change its output after a short propagation time, following the leading edge of system clock.

Figure 3C:
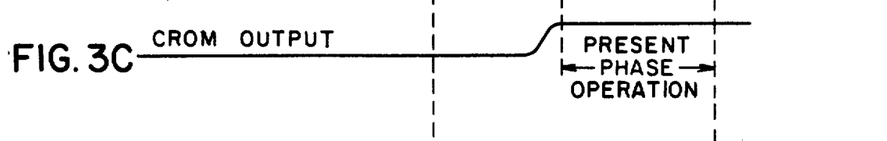

FIG. 3c shows the output of a CROM 13. The CROMs 13 are addressed by the output of the control memory address register; therefore the outputs of the CROMs will change following the access time delay inherent in the CROM. The outputs of at least one of the CROMs are presented to the condition multiplexer 14 both as select control signals and as input signals in order to determine the next operation phase of the machine. Simultaneously, the present machine operation phase is taking place in the data path or main memory. These data path and memory operations take place in parallel with the determination of the next operation phase of the device.

Figure 3D:
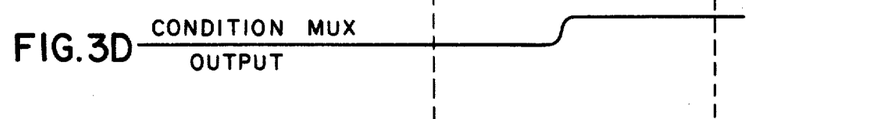

FIG. 3d shows the output of the condition multiplexer 14. Only a short time delay is required between the occurrence of the signals at the input to the condition multiplexer and availability of stable output signals at the outputs of the condition multiplexer. The output signals from the condition multiplexer are in turn presented to the first stage control memory (AROM) 16 as an address input.

Figure 3E:
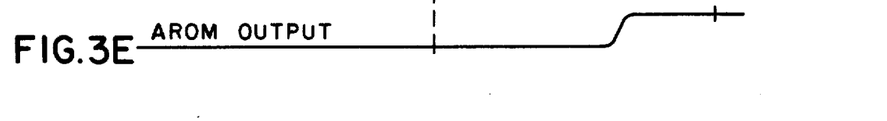

FIG. 3e shows the outputs of the first stage control memory (AROM) 16. These outputs become stable at a time determined by the access time of the first stage control memory following stable address inputs to the device. The output is the address of the control word in CROM which defines the next operation phase.

In partial summary, there have been defined two functions of the control logic, first the control of the function of the machine in the present machine state and secondly, the function of determining the proper next operation phase of the machine. The second stage control memory 12, in conjunction with the condition multiplexer 14 and the first stage control memory 16, functions to determine the proper next operation phase of the machine. The control of the machine in the present operation phase is accomplished by a variable number of CROMs 13 which form part of the second stage control memory 12. The number of CROMs required for any given machine is determined by the complexity of the data path 110, the control requirements of the main memory 100, and the number and type of input/output devices 20. It has been previously stated that it is an object of the present invention to determine the next operation phase of the machine by fast and economical means. The disclosed approach meets both of these criteria. It is fast because the determination of the next operation phase is done concurrently with the execution of the functions defined in the present operation phase of the machine. It is economical because of the minimal number of additional hardware devices required to address a large number of operation phases, as well as the small number of CROM output bits required. The additional random logic, which again should be minimal, is limited to the first stage control memory 16 (AROM), and the condition multiplexer 14. Also, as shown in the timing diagrams of FIGS. 3a–3e, no additional machine cycles are required for determination of the next operation phase since this determination can be done simultaneously with the execution of the functional requirements of the present operation phase. Additionally, FIGS. 3a–3e illustrates that the machine cycle of the data processor need not be slowed by the implementation of this technique.

Figure 4:
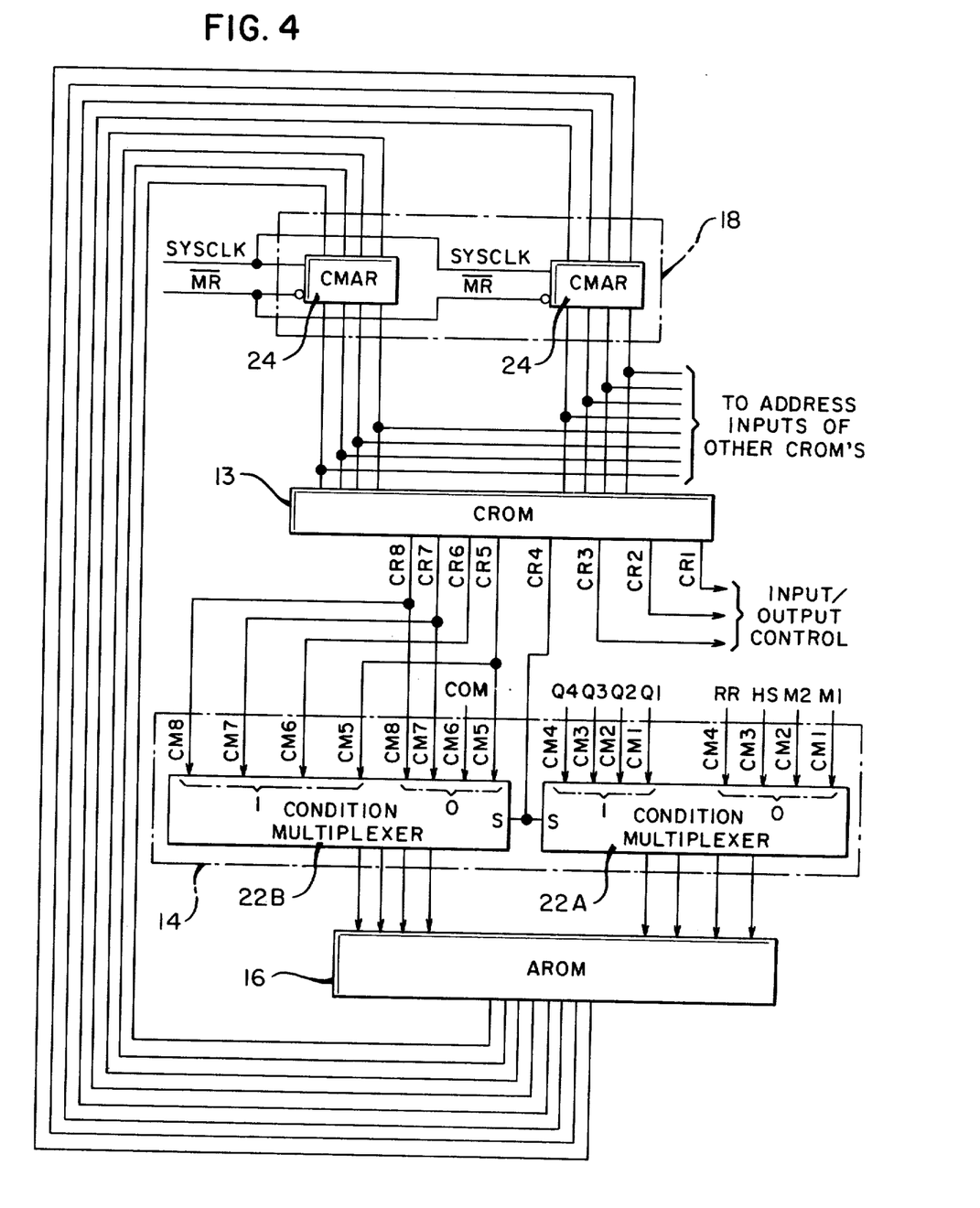
FIG. 4 is a detailed logic diagram of the two level microaddressing controller.

Referring to FIG. 4, which is a detailed logic diagram of the preferred embodiment of the central processor controller 10, the control memory address register 18 is implemented using two 4-bit registers 24 which registers may be Texas Instruments 74175 Quad registers. These registers are clocked by the system clock SYSCLK and are cleared or initialized by the master reset signal MR. The registers 24 provide an 8-bit input address to each of the CROMs 13 of the second stage control memory 12. In FIG. 2 a number of CROMs 13 are shown forming the second stage control memory 12; only the first CROM 13 is shown in FIG. 4. The 8 address bits from registers 24 are sufficient to address up to 256 control words in the second stage control memory. It has been determined, by completing the flow charts for all program instructions that the inventors desired to implement on this data processor, that less than 256 unique operation phases, or control words, are needed to control the operation of the data processor. Each of the CROMs 13 may be implemented with a Signetics 8204 read only memory. Each of the CROMs 13 is a 2048 bit device organized as 256 words 8 bits wide. The remaining CROMs 13 forming the second stage control memory 12 are added in order to satisfy the control requirements of the data path 110, the main memory 100, and the peripheral devices 20. The three least significant outputs of the first CROM 13, designated CR3, CR2 and CR1, may be dedicated to input/output control. The output from CROM 13 designated as CR4 is used as the select control to the condition multiplexer 14. The condition multiplexer 14 is shown comprised of two condition multiplexer units 22A and 22B. The units may be Texas Instruments 74157 Quad 2 to 1 multiplexers. The output bits 5, 6, 7 and 8 which appear at the CROM 13 outputs, designated CR5, CR6, CR7 and CR8 respectively, are used as input terms to the condition multiplexer unit 22B.

Each of the condition multiplexer units 22A and 22B receives the bit signal CR4 on the S input. When the bit signal CR4 is a "1" the terminals CM1 to CM4 of multiplexer unit 22A are switched to receive the signals Q1 to Q4 respectively, from a selected program instruction, as subsequently described in connection with FIG. 5, and when the bit signal CR4 is a "0", the terminals CM1 to CM4 are switched to receive the signals M1, M2, HS and RR respectively as shown in FIG. 4. The signals M1 and M2 are taken from the currently selected program instruction (i.e., the instruction under execution), while HS represents a halt signal input by the operator, and RR represents a "register-to-register" signal generally derived from the decode of the operation code field of the program instruction from the main memory 100.

The condition multiplexer unit 22B operates in a like manner connecting the terminals CM5 to CM8 to receive the signals CR5, COM, CR7 and CR8 respectively, when the bit signal CR4 is a "0" and connecting the terminals CM5 to CM8 to receive the signals CR5 to CR8 respectively when the bit signal CR4 is a "1".

Figure 7:
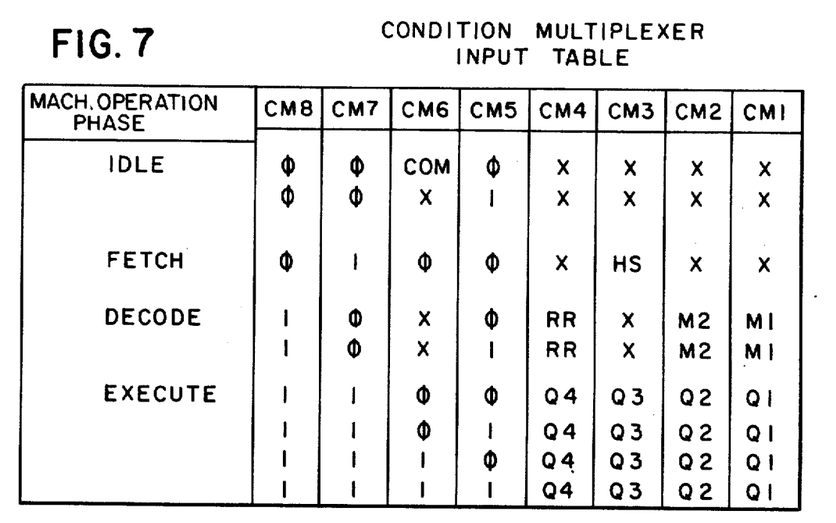
FIG. 7 is a table showing control signal inputs to the condition multiplexer from external sources and the second stage control memory for determining the address of the next required operation phase of the machine.

The input signal conditions for the condition multiplexer units 22A and 22B are defined by the table shown in FIG. 7. The outputs of the condition multiplexer are eight in number and these are used as the address inputs to the AROM 16 (first stage control memory). The AROM 16 may be implemented using a Signetics 8204 read only memory. All eight outputs of the AROM 16 are returned as inputs to the registers 24 which comprise the control memory address register 18 (CMAR). These signals on the register input lines will be latched into the registers on the leading edge of the following system clock pulse.

Figure 5:
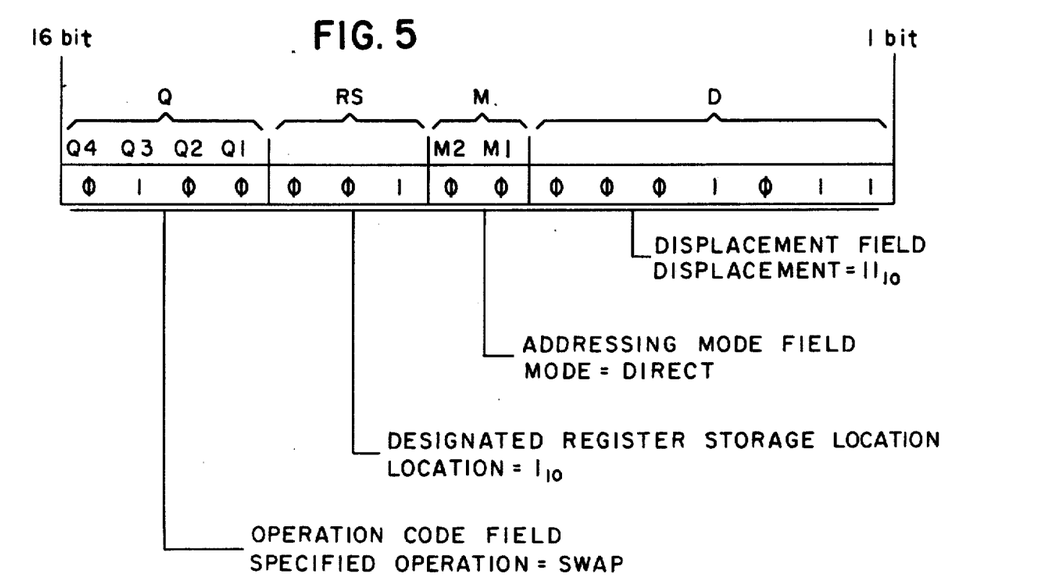
FIG. 5 illustrates the format of a typical program instruction utilized in the operation of the invention.

Referring now to FIG. 5, there is shown a program instruction of the type executed by the data processor of the present invention, which instruction is 16 bits long, with the least significant bit being indicated bit number 1. This program instruction comprises four fields. The D field or displacement field indicates a relative address displacement in the main memory 100. The particular instruction shown shows a displacement of 11. The M field is an addressing mode field. The two bits of the M field could be used to indicate a maximum of four modes of addressing. The particular example shown illustrates a direct addressing mode; that is, bits M1 and M2 are $\phi$, $\phi$ respectively. The RS field indicates the designated register storage location in the data path 110. The designated register storage location in this example is location 1. The Q field is the operation code field of the program instruction and comprises four bits Q1 to Q4. The operation called for in this particular program instruction is a SWAP operation.

A brief general description of the functions of the fields of the program instruction word follows: The D or displacement field is used, in general, to define either an address or an offset from a register and is used to define a memory address. The M or addressing mode field is used to define the particular addressing mode of the program instruction word. Typically, these addressing modes would include the direct, the indirect, the indexed and the relative addressing modes. In the direct mode, the displacement is taken directly as the particular memory address. In the indexed mode, the displacement field is added to a particular index register; while in the relative mode, the displacement is added to a program counter register. The RS field designates a register storage location field in general, and specifies a particular register storage location in the data path 110. The Q field, or operation code field, defines the particular operation called for by the program instruction word. Typically, this includes the macro-level instructions which can be performed by the data processor.

Figure 6:
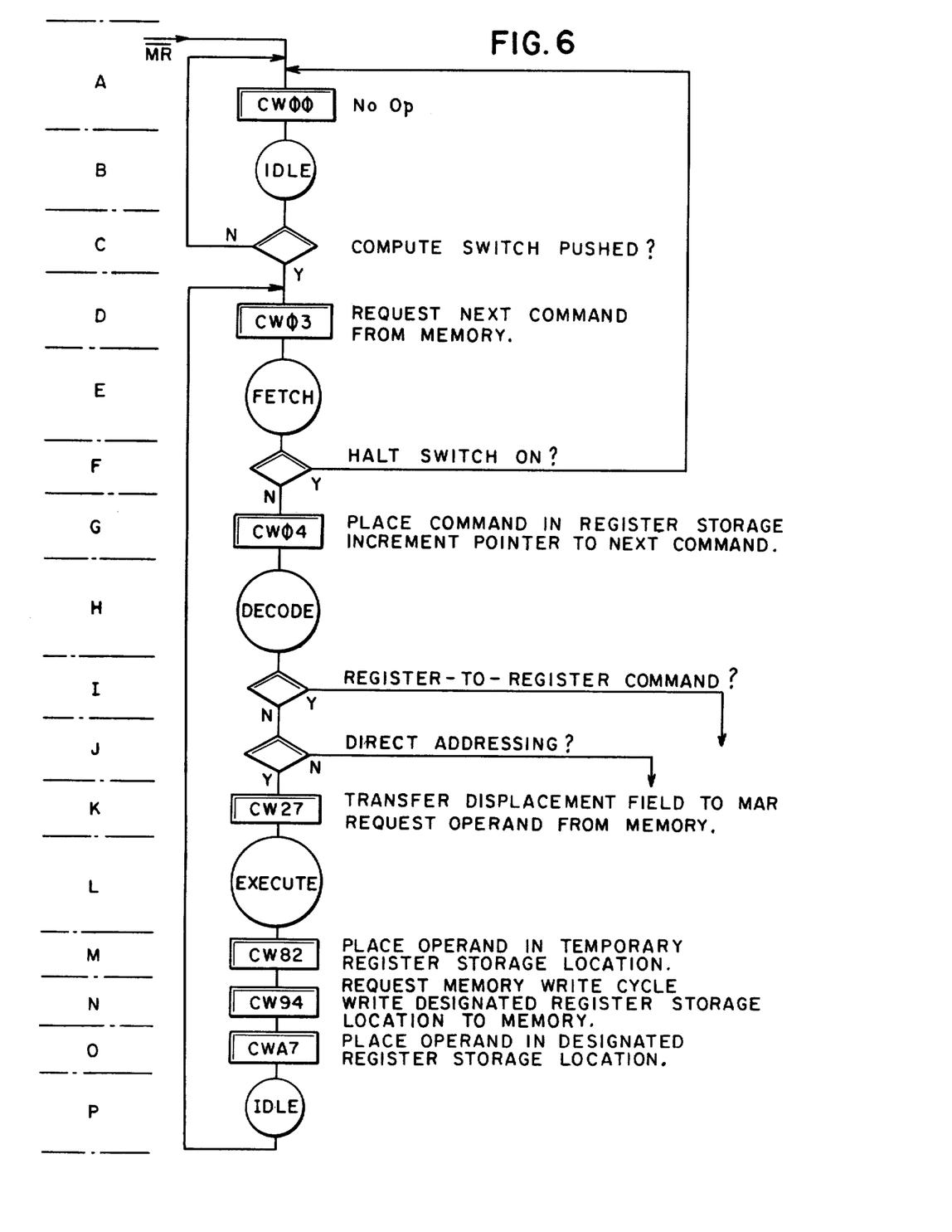
FIG. 6 is a flow chart giving an example of the microprogram sequencing of the microaddressing controller for controlling the execution of one of a multiplicity of program instructions available in the data processing system.

FIG. 6 illustrates a complete flow chart of a particular program instruction executed by the data processor utilizing the controller. Referring to FIG. 5 with FIG. 6, the particular program instruction illustrated is the SWAP program instruction, the execution of which causes the data processor to take a memory word from the main memory 100 and to place the memory word into the designated register storage location of the register storage 112 of the data path 110, and to take the data word originally in that register storage location and to place it in the main memory 100 at the location of the word just previously read from main memory.

FIG. 6 shows various levels A-P of the microprocessing flow which together make up the execution steps for the SWAP instruction previously referred to. The control words (CW$\phi\phi$, CW$\phi$3, CW$\phi$4, CW27, CW82, CW94 and CWA7) represent the set of control words which in turn represent the set of machine operation phases required to execute the aforementioned program instruction SWAP. The diamond-shaped symbols in FIG. 6 represent decision points in the microinstruction flow where the following operation to be performed depends from external conditions such as the depression of a COMPUTE or HALT switch, or the presence of a particular configuration of bits present in the SWAP program instruction. The symbol N means "no" and the symbol Y means "Yes" which are the two only possible responses to the questions represented by the diamond-shaped symbols.

At level A of the flow chart FIG. 6 there is shown the symbology for the CW$\phi\phi$ which defines the initial operation phase of the processor following the activation of the master reset signal $\overline{MR}$ to the control memory address register 18.

The operation phase defined by the control word CW$\phi\phi$ of the second stage control memory 12 is a "no operation", or "IDLE" wherein the processor simply waits for external stimulus. At level B the processor responds to the control signals supplied by the control word CW$\phi\phi$ by performing the IDLE operation phase. The symbology shown at level B indicates that certain output bits of control word CW$\phi\phi$ will partially define the next operation phase of the data processor. In the IDLE operation phase, certain inputs need to be presented to the first stage control memory 16 through the condition multiplexer 14 in order that the next operation phase of the data processor may be determined.

Referring to the condition multiplexer input table of FIG. 7, in the IDLE operation phase, only three signal inputs need be presented. Condition multiplexer input CM8 and condition multiplexer input CM7 must both be held at a zero logic level in order to indicate to the address ROM 16 that the machine is presently in the IDLE operation phase. Condition multiplexer input CM5 must also be present as a logic zero or a logic one in order to define the operation phase mode. In IDLE operation phase mode 0 (CM5 is a logic 0), condition multiplexer input CM6 reflects the condition of the compute external switch. (CM6 equal to a logic 1 indicates the compute switch is depressed). In IDLE operation phase mode 1 (CM5 is a logic 1), condition multiplexer input CM6 is a "don't care".

Referring back to FIG. 6, at level C a check for external stimulus is made. In this particular program the external stimulus input is the compute signal. The compute signal is generated when, for example, an operator presses a compute switch. If the compute switch has not been pressed, an N response is obtained at level C and a return is made to the control word CW$\phi\phi$. If the compute switch has been pushed, a Y response is obtained at level C and control word CW$\phi$3 is selected as the next operation phase of the data processor.

It should be noted that the phase selection, operation phase execution, and the next operation phase determination, shown at levels A, B and C of the flow chart all occur in one machine cycle as previously illustrated in FIG. 3. As previously discussed, both the present operation phase operations (which in this case is the no-op shown at levels A and B) and the next operation phase determination (accomplished by selecting the IDLE operation phase and examining the position of the COM switch shown at level C) occur in parallel and in the same machine cycle.

At level D of FIG. 6, the control word CW$\phi$3 is used to request the next program instruction from memory; at level E the FETCH operation phase is entered, and at level F a check is made to determine whether or not the halt switch is on. This check is made so that in the normal execution of machine instructions, a check may be made between program instructions to see if a program halt is desired. If a Y response is obtained at level F the processor is placed back into the IDLE operation phase. If the halt switch is not on, an N response is obtained at level F and the control word CW$\phi$4 is used to place the program instruction in register storage and to increment a pointer register to the next command. The point register referred to at level G is a register in register storage 112. This register always contains the main memory location of the next program instruction to be executed.

At level H is shown the entry into the DECODE operation phase in which the data processor determines the addressing mode of the current program instruction and takes appropriate action in order to read the requested memory operand if required.

In the general case, a check would be made to determine whether the command just read is a register-to-register command. If it is, that is, if a Y response is obtained, then an immediate branch is made to a unique control word for that type of program instruction. If not, that is, if an N response is obtained, implying a memory referenced type instruction, then an additional check at level J is made. The check at level I of the flow chart for a register-to-register instruction is checking to determine whether or not another operand must be read from main memory in order to execute the instruction. If the instruction read is a register-to-register instruction, it implies that both operands are already present in the register storage 112 of the data path 110 and that no further memory references are needed to execute this instruction. For the SWAP instruction, a check is made at level J to determine if the memory referenced instruction is using the direct addressing mode. If a Y response is obtained, then control word CW27 is selected at level K; if an N response is obtained, then another unique control word is selected which is appropriate to the addressing mode used.

At level K is shown the control word CW27, which control word performs the function of transferring the displacement field of the program instruction word (as indicated by D in FIG. 5) to the memory address register 105 of the main memory 100 and requests the operand from the memory location specified by the contents of the memory address register 105.

At level L is the entry to the EXECUTE operation phase in which the actual execution of the function defined by the program instruction word is accomplished.

At level M, control word CW82 defines operations which require that the operand just read during the DECODE operation phase be placed in a temporary register storage location 112.

At level N, the control word CW94 requests a memory write cycle and the designated register storage location specified by the program instruction word is written to memory.

At level O the control word CWA7 requests that the operand previously read from memory be removed from the temporary register storage location and be placed in the designated register storage location.

The control word CWA7, which is the last control word required for the execution of the SWAP instruction, also forces the data processor to return to the FETCH operation phase of level E by calling for the control word CW$\phi$3, at level D.

A more detailed example of the operation of the microprogram controlled utilized for controlling the functions of the data processing system of which it is a part follows: The table of FIG. 8 sets forth the relationships between the system clock SYSCLK, the inputs to the CROM 13, the outputs of the CROM 13, the inputs to the AROM 16 and the AROM 16 outputs.

Figure 8:
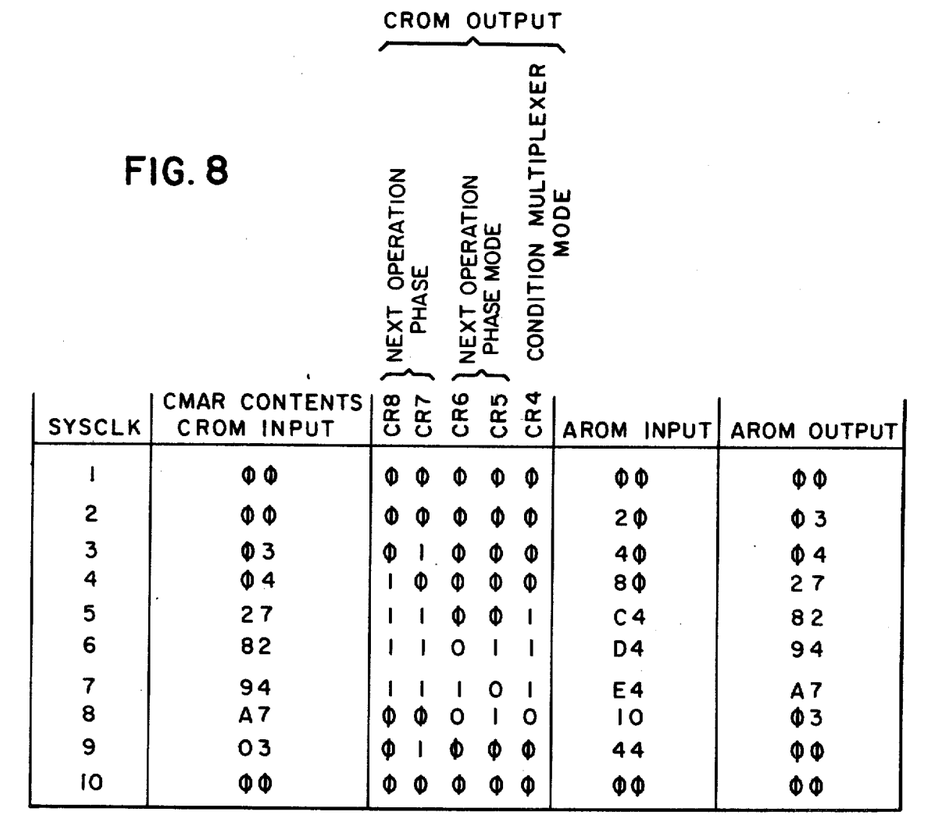
FIG. 8 is a table illustrating the programming of both levels of control memory for selected locations corresponding to one program instruction.

The contents of the columns labelled CMAR contents (CROM input), AROM input and AROM output are given in hexadecimal notation. Hexidecimal notation is a shorthand means of indicating the value of a binary string of digits. The binary string is divided into groups of four, starting from the least significant digit; the groups of four are then given single decimal digit values. Decimal values of ten and above are given alphabetic values starting with A having a value of 10 and running through F having a value of 15. The explanation of the table shown in FIG. 8 is done in conjunction with the flow chart of FIG. 6 and the condition multiplexer input table of FIG. 7. In the FIG. 7 table the notation "X" indicates a "don't care state". That is, the signal at the particular input can be of any logical level without affecting the operation of the processor. The notation "$\phi$" corresponds to a logical "zero" and the notation "1" corresponds to a logical "1". The table of FIG. 7 also shows that the IDLE and DECODE operation phases have two modes each. The EXECUTE operation phase shows four modes. The bit code on the condition multiplexer input table labelled CM8 and CM7 indicates to the AROM 16 the particular operation phase of the data processor. For example, the bit code $\phi\phi$ indicates an IDLE operation phase; $\phi$1 indicates the FETCH operation phase; 1$\phi$ indicates the DECODE operation phase and 11 indicates the EXECUTE operation phase. The signals present at the inputs labelled CM6 and CM5 determine which of the modes are to be executed. Since IDLE operation phase has two modes, only one bit is needed to define the mode, namely CM5. As shown in FIG. 7 for the IDLE operation phase in which CM5 is a logic 0 (i.e., mode 0), CM6 is either a logic zero or a logic one depending upon the condition of the external compute switch (not depressed or depressed respectively). The CM6 input is a "don't care" for IDLE operation phase, mode 1 (CM5 is a logic 1).

The CM1 to CM4 inputs to the condition multiplexer 14 are either of the group consisting of M1, M2, HS and RR respectively, or the group consisting of Q1 to Q4 respectively. The particular group is chosen by the logical level of the signal applied to the S input of the condition multiplexer unit 22A from the CROM output labelled CR4 as is shown in FIG. 4.

On the first line of FIG. 8 are shown the conditions existing immediately after the activation of the Master Reset (MR) signal to the system. At the first SYSCLK pulse, the CMAR 24 (again referring to FIG. 4) contains all zeros since it was cleared by MR; therefore, the control word CW$\phi\phi$ of the CROM 13 is addressed. The CROM bits CR8 through CR4 of control word CW$\phi\phi$ must be programmed to be all zeros as shown, in order that the machine will remain in the IDLE operation phase. In particular, the output CR4 must be a zero in order that the particular set of inputs required in the IDLE operation phase as shown in FIG. 7 are selected through the condition multiplexer units 22A and 22B as shown in FIG. 4. The AROM 16 input from the condition multiplexer is thus hex $\phi\phi$ and the AROM output for input address $\phi\phi$ is programmed to be a hex $\phi\phi$. On line 2 of FIG. 8, the second SYSCLK then latches the AROM output into the CMAR 24, so that the control word CWϕϕ of the CROM 13 is again selected during the second machine cycle. Again, CR8-4 are output as all zeros so the machine could remain in the IDLE phase indefinitely. Let us assume, however, that the compute switch is pushed during this machine cycle, forcing the AROM input to hex 2ϕ; this is the case for COM = 1 which can be seen from line 1 of FIG. 7. The inputs at CM4 thru CM1 are "don't care" values in the determination of the next operation phase control word address. Here these inputs are zero since RR, HS, M2, and M1 are equal to zero. This is so since no instruction fetch or decode has occurred; the M2 and M1 inputs are the memory addressing mode of the program instruction and are zero; the RR, register to register signal, is zero for the same reason; the HS signal is zero indicative of the HALT pushbutton not being depressed. The AROM is programmed to produce a hex ϕ3 output for address input 2ϕ as shown on line 2 of FIG. 8. The flow chart, FIG. 6, shows that if the COM signal equals 1 at level C, then the control word CWϕ3 defines the proper next operation phase of the data processor.

At line 3 of FIG. 8 is shown that on the third SYSCLK pulse, the AROM output is latched into the CMAR, addressing the control word CWϕ3 in the CROM. Outputs CR8-4 of the control word CWϕ3 are programmed to indicate a next operation phase of FETCH and a next mode of ϕ; in addition CR4 is programmed as a zero so that the inputs required by the FETCH operation phase as specified by FIG. 7 are selected through the condition multiplexer 22A and 22B. Since COM now equals ϕ, the AROM input now becomes hex 4ϕ if the halt switch HS is not pushed. (The compute signal COM is associated with the compute external switch or pushbutton on an operators panel associated with the data processor. The handling of the COM signal is performed in a manner to allow proper operation of the processor. For example, when the compute pushbutton is depressed the COM signal latches and is reset after it is read by the condition multiplexer. Qualifying logic is also designed such that the COM signal is disabled if the processor is not in the IDLE phase of operation.) The CM4, CM2, and CM1 inputs corresponding to RR, M2, and M1, respectively, are zero for the same reason as before. The AROM output for input address 4ϕ is programmed as hex ϕ4, as shown at level G of FIG. 6.

On line 4 of FIG. 8, the fourth SYSCLK pulse causes the control work CWϕ4 to be addressed in the CROM. Outputs CR8-4 are programmed to indicate a next operation phase DECODE and a next operation phase mode of ϕ. CR4 remains a zero so that the input needs to the condition multiplexer of the DECODE operation phase, as shown in FIG. 7, may be satisfied. The input to the AROM then becomes hex 8ϕ which produces a hex 27 outut. Note that if the RR, M2, or M1 signals to the condition multiplexer had been = 1 in this case, indicating another addressing mode or type of instruction, then the input to the AROM would have been different. For instance if RR did = 1, then the input to the AROM would equal hex 88 and a new output (different CROM input address) would be produced.

On line 5 of FIG. 8, the fifth SYSCLK pulse causes control word CW27 to be addressed in the CROM. Outputs CR8-4 are programmed to indicate a next operation phase EXECUTE and a next operation phase mode of ϕ. Note that CR4 is programmed as a 1 so that Q4-Q1, the operation code field of the instruction, may be input to the AROM through the condition multi-plexer. The combination of CR8-5 and the Q field from the SWAP instruction causes the AROM input to become a hex C4 (the operation code for the SWAP instruction is a hex 4 as shown in FIG. 5) and the output of the AROM (the contents of location C4 in the AROM) becomes hex 82.

On line 6 of FIG. 8, the sixth SYSCLK pulse causes the control word CW82 of the CROM to be addressed and the outputs CR8-4 of control word CW82 indicate a next operation phase EXECUTE and a next operation phase mode of 1. Since the next operation phase remains EXECUTE, CR4 is programmed to remain a 1. The input address to the AROM becomes hex D4 and the output of the AROM becomes hex 94. Although the current discussion centers on the means by which the next operation phase is determined, it bears repeating that the present operation phase is taking place at the same time. For instance, during this machine cycle, the control word CW82 is providing control signals which cause the memory operand to be placed in a temporary storage location, as indicated at level M of FIG. 6, as well as providing the CROM 13 outputs CR8-4.

On line 7 of FIG. 8, the seventh SYSCLK pulse causes the control word CR94 of the CROM 13 to be addressed. CR8-4 of this control word specifies EXECUTE, operation phase mode 2; the AROM 16 receives an input of hex E4 and produces a hex A7 output.

On line 8 of FIG. 8, the eighth SYSCLK pulse latches the previous AROM output of A7 into the CMAR 18, and causes the control word CWA7 of the CROM 13 to be addressed. This is the last control word required in the execution of the SWAP instruction. Therefore, CR8-5 of control word CWA7 specify a next operation phase IDLE and a next operation phase mode of 1. CR4 is programmed as a ϕ so that the condition multiplexer inputs will be switched over to the inputs required by the IDLE operation phase as shown in FIG. 7. The AROM 16 then receives an input of hex 1ϕ and produces an output of hex ϕ3.

On line 9 of FIG. 8, the ninth SYSCLK pulse causes the control word CWϕ3 to be addressed, which will cause the next program command to be read from main memory. CR8-5 specify a next operation phase FETCH and a next operation phase mode of ϕ. If we now assume that the halt switch (HS) has been pushed sometime during the execution of the SWAP instruction, then the AROM 16 input will now be hex 44. Location 44 of the AROM 16 is programmed to produce an output of hex ϕϕ which will then force the data processor back into the IDLE operation phase after the next SYSCLK as shown on line 10 of FIG. 8.

From the foregoing description it can be seen that the control terms required for a next succeeding operation phase are determined during the execution of the present operation phase of the data processing system, and that sequences of operation phases are not fixed, but may differ depending on external stimuli (halt and compute switches), program instruction codes and other system signals presented to the AROM 16 through the condition multiplexer 22.

While there has been shown what is considered to be the preferred embodiment of the present invention, it will be manifest that many changes and modifications may be made therein without departing from the essential spirit of the invention. It is intended, therefore, in the annexed claims to cover all such changes and modifications as may fall within the true scope of the invention.

What is claimed is:

1. A data processor comprising:
   (a) a main memory containing a plurality of program instruction words, and a plurality of data words, said main memory being responsive to control signals for selecting said program instruction words and said data words:
   (b) a data path connected to said main memory for carrying said data words;
   (c) a controller, connected to said main memory by said data path, said controller comprising:
   a first stage control memory containing addresses for accessing addressable control words contained in a second stage control memory;
   said second stage control memory is operatively connected to said main memory and contains addressable control words, said control words upon selection causing a plurality of said control signals to be generated from said second stage which causes execution of a current operation phase and which, in combination with input signals generated from a plurality of external switch means and a plurality of program instruction signals from an instruction word selected from said main memory, provides at the input of said first stage control memory signals for obtaining the address of the next required control word.

2. The controller according to claim 1 wherein said controller further comprises:
   a multiplexer, interposed between said second stage control memory and said first stage control memory for receiving and selectively passing said control signals from said second stage control memory, for receiving and selectively passing said input signals generated from said external switch means, and for receiving and selectively passing said program instruction signals from said main memory for the generation of signals for the obtaining from the first stage control memory the address of said control word contained in said second stage control memory.

3. The controller according to claim 1 wherein the said controller further comprises:
   a control memory address register interposed between said first stage control memory and said second stage control memory for temporarily holding the selected address of the next required control word during the time interval of the execution of the operation phase initiated by the currently selected one of said control words.

4. In a data processor having a main memory containing a plurality of program instruction words and a plurality of data words wherein the next operation phase is determined simultaneously with the execution of the present operation phase so as to provide selectability of the sequence of operation phases, a controller operatively connected to said main memory by means of a data path to receive said data and instruction words, said controller comprising in combination:
   a first stage control memory having addressable contents for holding addresses for accessing corresponding addressable control words contained in a second stage control memory;
   said second stage control memory, operatively connected to said main memory and containing addressable control words, for receiving an address of the next desired addressable control word from said first stage control memory and which provides at the output of said second stage control memory, second stage control signals having portions thereof which form said address of said first stage control memory in conjuction with additional signals, the contents of said first stage control memory at said address corresponding to the address of the next desired addressable control word contained in said second stage control memory; and
   multiplexer means having inputs operatively connected to the output of said second stage control memory and to said data path for receiving some of said additional signals in the form of a program word for which selectively forming said address of said first stage control memory and having outputs operatively connected to the input of said first stage control memory, said multiplexer means being responsive to a selection signal for selecting a first or a second group of said inputs so as to provide at its output said address of said first stage control memory, the contents at said address of said first stage control memory corresponding to the address of the next desired addressable control word.

5. A data processor wherein the address of one of a plurality of control words used for controlling the operation of said data processor during a subsequent one of a plurality of machine cycles is selectively determined during the execution of a current one of said plurality of machine cycles comprising:
   (a) a main memory comprised of:
   a storage array for storing a plurality of program instruction words and a plurality of data words;
   a memory address register operatively connected to said storage array for addressing said program instruction words and said data words;
   a memory data register operatively connected to said storage array for temporarily storing program instruction words and data words input into or output from said storage array; and
   means responsive to signals from a central processor controller for selecting one of each of said program instruction words and said data words for current execution;
   (b) a data path operatively connected to said main memory, said data path comprised of:
   register storage for temporarily storing said selected ones of said program instruction words and said data words received from said main memory;
   an arithmetic logic unit operatively connected to said register storage for modifying said selected ones of said program instruction words and said data words temporarily stored in said register storage;
   (c) said central processor controller being operatively connected to said data path, said central processor controller comprised of:
   a first stage control memory for storing a determined address of one of a plurality of control words contained in a second stage control memory;
   a control memory address register operatively connected to said first stage control memory for selecting said one of a plurality of said control words in accordance with said determined address;

said second stage control memory operatively connected to said control memory address register for storing said plurality of control words;

a condition multiplexer operatively connected to said second stage control memory and responsive to input signals from said second stage control memory, external switches, control flags internal to said central processor controller, an instruction addressing field of said selected one of a plurality of said program instruction words currently being executed, for generating an input signal to said first stage control memory, said input signal to said first stage control memory constituting an address for selecting said determined address of said control word stored is said first stage control memory.

6. The central processor controller of claim 5 wherein said second stage control memory is comprised of a plurality of read only memory elements having their address inputs connected in parallel.

* * * * *